March 12, 1963     E. L. MERRITT     3,080,801
ZENITH CAMERA SYSTEM

Original Filed July 29, 1958     2 Sheets-Sheet 1

INVENTOR
EVERETT L. MERRITT

BY Walter S. Paul.

ATTORNEY

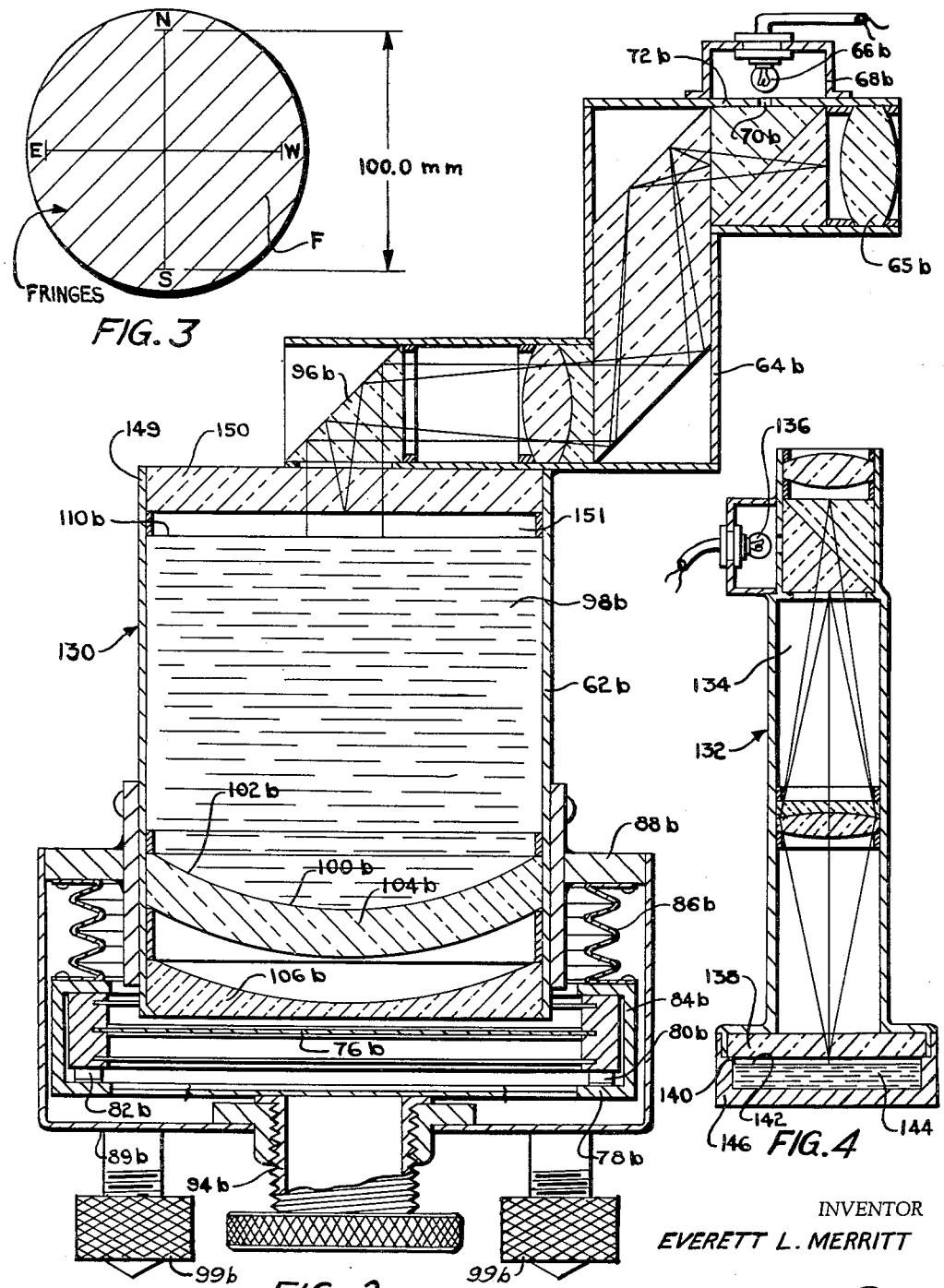

3,080,801
ZENITH CAMERA SYSTEM
Everett L. Merritt, Falls Church, Va., assignor to Photogrammetry, Inc., Silver Spring, Md., a corporation of Delaware
Original application July 29, 1958, Ser. No. 751,771, now Patent No. 2,995,992, dated Aug. 15, 1961. Divided and this application Sept. 20, 1960, Ser. No. 80,713
10 Claims. (Cl. 95—1.1)

This invention relates to cameras and particularly to zenith camera systems and cameras whose accuracy and complexity varies in accordance with local requirements.

This application is a division of application Serial No. 751,771 filed July 29, 1958, new Patent No. 2,995,992.

To exemplify the principles of the invention several zenith cameras as illustrated and described in the parent application. The first is a self-levelling zenith camera requiring a single exposure, simplified data reduction and a position accuracy of twenty seconds. This system is intended for reconnaissance. A second design is based on manual autocollimation and is intended to yield an accuracy of one arc second. The third camera system is embodied in a design based on levelling through the use of interference fringes and has for a design achievement accuracy to one-fifth arc second. The latter is an instrument for earth configuration studies and Laplace equation data. The present application is based on the second and third designs above referred to.

In order to obtain a better understanding of the problems solved by our invention and the place in the art which the invention occupies, it is necessary to consider some current equipment and technical information surrounding the invention and current equipment. Accordingly, considering the definition of the vertical, it is the normal to an equipotential surface or the apparent resultant direction of gravity. The astronomic coordinates of an exposure station are the direction angles of the vertical referred to the equator and the Greenwich meridian. The gravitational vertical differs from the normal to an ellipsoid of revolution. The ellipsoid of revolution is a mathematical configuration that corresponds to a homogeneous earth with a constant elevation. The earth is not homogeneous and has an undulating equipotential surface rising above the mathematical configuration in highland masses and falling below the mathematical configuration over the oceans. Thus aside from the fact that the normal to one level surface is not normal to another level surface above or below a given point, the maximum and minimum points of the geoidal surface are more or less parallel to the ellipsoid of revolution. The greatest differences between the mathematical normal and the geoidal normal occurs at the deflection points and are the changes in the geoidal surface from high to low. The undulating character of the geoidal surface is explained in terms of the theory of Isostasy. According to the theory of Isostasy there is an equipotential surface at some depth referred to as the isostatic compensation. This surface more nearly approximates one that may be defined mathematically. The depth of isostatic compensation is based on the assumption that unit surface areas have unit masses regardless of height down to a depth of sixty or seventy kilometers. Therefore it is assumed that the deviation of the plumb is due to variations in density of the material in the immediate vicinity of the exposure station. The various surfaces are easily visualized, and the deviation from the plumb is on an average of plus or minus two arc seconds over the world with a few isolated examples exceeding plus or minus one arc minute.

Insofar as the application of astronomic data is concerned, one can easily draw an erroneous conclusion that astromonic data, being subject to deviation of the plumb, is inaccurate and useless. In many cases the astronomic coordinates of the direction of gravity are determined with greater accuracy that the geoidic coordinates of the normal to the ellipsoid. Astronomic coordinates have the following basic uses:

(1) Astronomic coordinates may be employed in remote areas where no geoidic control exists.

(2) Astronomic coordinates are required for Laplace equation data employed in the adjustment of triangulation nets.

(3) The true shape of the geoid is no better than the number and accuracy of the observed astronomic coordinates.

(4) Other types of physical measurements such as those relative to terrestrial magnetism and gravity must be supplemented with astronomic coordinates at the observation station.

The Air Force zenith camera is used as a typical example of current equipment. This zenith camera consists of a fixed focus lens-cone assembly and a vertical spindle equipped with two horizontal level vials mounted normal to each other. The whole assembly is supported on three foot screws. The camera is oriented on the vertical in the usual manner of alternately adjusting level vials and working the foot screws until the bubbles remain centered in an azimuthal rotation of 360° about the vertical. The mechanical axis then defines the vertical within the accuracy of the bubbles and spindle, and the optical axis of the camera either defines the vertical or generates a cone with equal zenith angles whose axis is the mechanical axis. The mean astronomic coordinates of two exosures 180° apart are the astronomic coordinates of the mechanical axis. The geometry of the conventional arrangement is quite well known.

The most expensive part of this instrument and the most subject to damage and malfunction is the vertical spindle. Removal of the vertical spindle removes a source of error, a possible malfunction in the filed, and reduces the manufacturing costs.

This invention contemplates the omission of that spindle. Assume fixed bubbles are mounted on the camera and that the spindle serves only as a convenient means of azimuth rotation. Let the bubbles be centered by working the foot screws and an exposure be made. Then rotate the camera 180° about the vertical, recenter the bubbles and make a second exposure. It is evident that the optical axis again generates a fixed cone whose axis is the normal to the equipotential surface defined by the centered bubbles. The accuracy of the generated cones symmetry is only dependent on the reproductability of the bubbles and is independent of the spindle accuracy. Some experience with this technique demonstrates that an operator can center the bubbles with each exposure easier than he can adjust the bubbles and hope they will remain centered for the time of two exposures. A position accuracy of five arc seconds with a four inch focal length using the fixed bubble technique suggest that greater accuracy may be obtained with the zenith camera of the Air Force if it were used as a fixed bubble camera, and the invention exploits this theory.

The present method of data reduction of zenith camera exposures is referred to as the method of dependencies. The method of dependencies is one of iteration and assumes the interior orientation data to be correct. Data reduction suggested embraces calibration of the exposure as a preliminary to astronomic position with a three star image solution or a simultaneous determination of interior orientation and astronomic coordinates with a four star image solution. The theory behind calibrating such exposure is that it is physically impossible to repeat the plate orientation and plate image distance corresponding to laboratory derived interior orientation data. Therefore, there is a particular interior orientation for each exposure that if known, will improve the accuracy of the reduced astronomic coordinates.

The accuracy of astronomic positions obtained with prismatic astrolabes suggests that still greater accuracy may be obtained without reversal by a method of vertical autocollimation. The method, again, can be practiced by revising the Air Force zenith camera and using some auxiliary equipment including an autocollimating eyepiece mounted on the objective end of the Air Force zenith camera and that is adjustable axially and laterally.

The foregoing shows the modification in technique and one existing, currently used zenith camera. The purpose of this invention, apart from providing new zenith camera designs, is to lead to a more accurate determination of the astronomic coordinates of a camera station by photogrammetric means and a more expeditious determination of the astronomic coordinates of a camera station for those situations where the highest accuracy is not paramount or trained operators are not available. By revising the current zenith camera discussed above, it can be shown that the existing zenith cameras and camera techniques can be altered to achieve this end and perhaps, more important, prove the feasibility of the new zenith cameras and zenith camera systems mentioned herein and including as a minimum, the self-leveling type requiring a single exposure and having a position accuracy of twenty seconds, the reconnaissance type, and the third described type based on levelling through the use of interference fringes and having an exceedingly high degree of accuracy, each type showing the zenith as a single point on a photographic exposure.

A more general purpose of the invention is to improve the accuracy and reduce the time of observation and data reduction of an astronomic position obtained by photogrammetric means. This is demonstrated by the fact that the accuracy of an astronomic position obtained by photogrammetric methods may equal and emulate the accuracy of astronomic position by mechanical-optical surveying methods. Moreover, it is possible to show that the star exposures for position may be reduced to the simplicity of an exposure with an amateur camera where only conventional navigation accuracy is required.

Other objectives and the various features of the invention will appear in the following detailed description of camera systems and techniques.

In the drawings which are for the most part diagrammatic,

FIG. 2 is a diagrammatic sectional view showing another camera with considerably greater accuracy than the first, this camera being suggested for research and being a refinement of the zenith camera shown in FIG. 1.

FIG. 3 is an elevational view showing interference fringes as they would be viewed in an eyepiece of an autocollimating telescope in the camera of FIG. 2.

FIG. 4 is a schematic sectional view showing a tilt meter, this being one of the instruments employed to measure the changing configuration of the earth's surface since it will exhibit interference fringes to a monochromatic collimated light source that are viewed through the eyepiece of the autocollimating telescope of the camera of FIG. 2.

Figure 1:
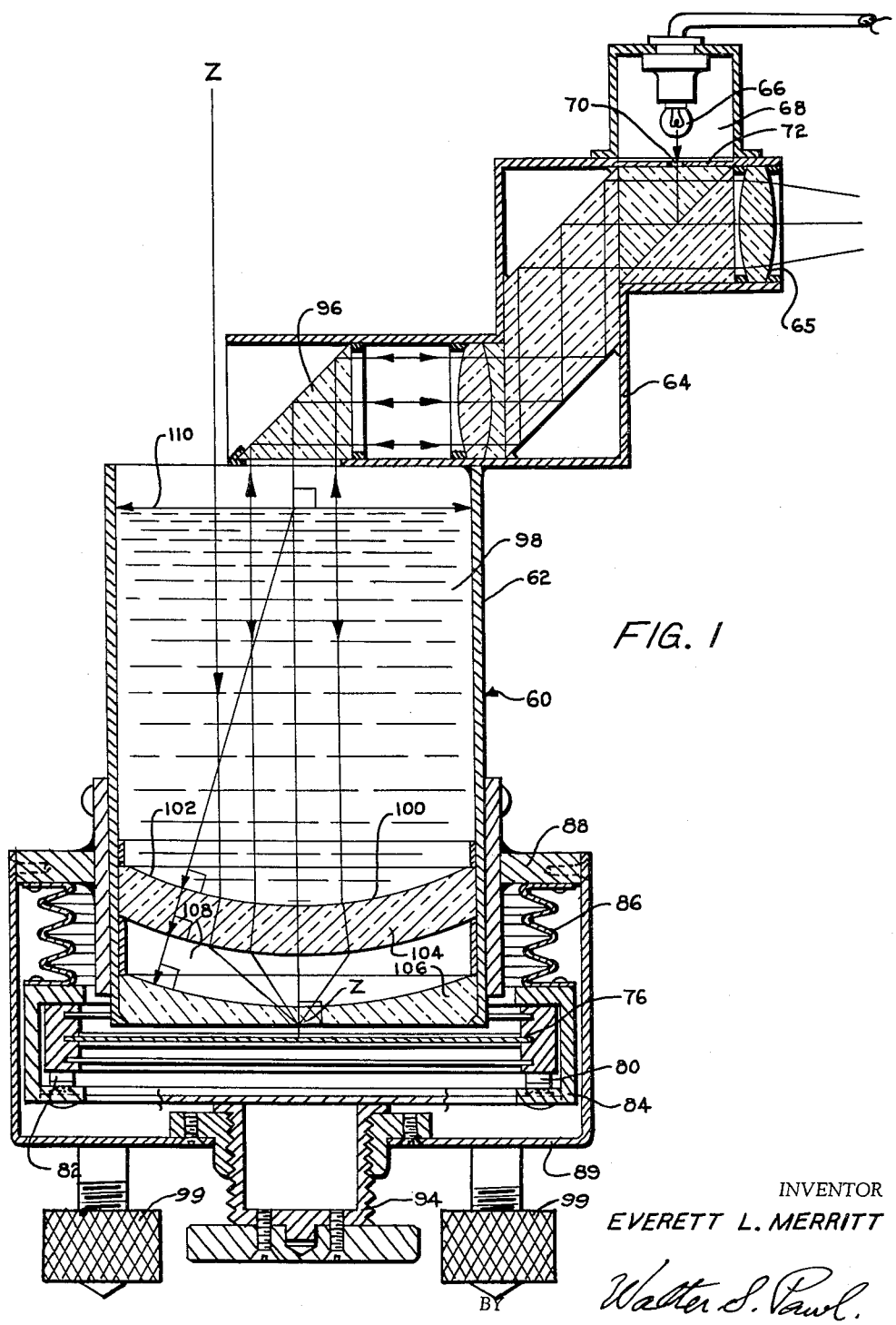
FIG. 1 is a camera based on manual autocollimation and is adapted for principal use in connection with geodetic work.

In FIG. 1 there is a camera 60 with a casing 62 having a conventional autocollimating telescope 64 thereon. The autocollimating telescope has an eyepiece or viewer 65, a source 66 of light shown as an electric lamp in its light chamber 68 and adapted to direct light rays through pinhole 70 in plate 72 that constitutes one wall or chamber 68. The grouping of lenses in the autocollimating telescope 64 is conventional.

The lower part of the casing 62 has a film plate 76 in a plate holder 78, the latter held in place by springs 80 and 82 in the adjustable film plate holder support 84. Support 84 has a side entrance for insertion and removal of holder 78, and is in a light-tight enclosure schematically represented by bellows 86. These are secured to a wall 88 of enclosure 90 that is attached to the lower part of the bowl of casing 62. Enclosure 89 has adjusting screw assembly 94 bearing against the bottom wall of support 84.

Prism 96 is the last lens in the series of lenses of autocollimating telescope 64. It is located above a group of three lenses in casing 62 and in alignment with photographic plate 76. This group of three lenses consists of a column of water 98 having a convex lower surface 100 established by the water column resting on the concave upper surface 102 of concavo-convex lens 104. The concavo-convex lens is spaced from the concave lens 106 by air space 108, and concave lens 106 is adjacent to the film plate 76.

Lens 98 is a positive plano-convex element since the upper surface 110 thereof is always planar regardless of camera tilt and the water lens is always concentric with the negative element (lens 104) of glass. In such a system the zenith point Z is the only point without refractive displacement regardless of the tilt of the camera. This is shown by following the rays identified as to direction by the arrows in FIG. 1 and going from the star field and passing through the telescope 65. In use, this camera is first leveled by the leveling screws 99 or the like at the bottom of the camera to bring the image of the light source to register with the cross hairs in the telescope. Then the zenith will fall on the principal point of the film in the camera.

While a built-in autocollimating telescope 64 is shown, the point of no displacement may be solved for analytically on a single exposure without levelling and therefore without the autocollimating telescope. If a lengthy computation is objectionable the water surface 110 may be autocollimated by working foot screws 99 that support the entire casing 62. The image, then, of the collimator center cross recorded with a single star exposure is an image of the zenith.

Camera 130 (FIGS. 2-4) is a refinement of the geodetic cameras and by comparison of FIGS. 2 and 4, it will be seen that the structure involved is almost identical. owever, camera 130 is to be used with auxiliary instruments in order to measure the changing configuration of the earth's surface. One of these instruments is tilt meter 132 (FIG. 4). Tilt meter 132 is constructed of an autocollimating telescope 134 with a monochromatic light source 136. A plano-parallel glass lens 138 is at the optical outlet end of the tilt meter beneath which there is an air space 140, for one configuration of tilt meter, the space being three millimeters in thickness. The three millimeter air space between the surface 142 of oil 144 in vessel 146 that is in optical alignment with the telescope 134, will take a wedge-shape when the tilt meter is tilted, and this will exhibit interference fringes (FIG. 3) to a monochromatic collimated light source. The fringes are viewed through the eyepiece of the collimating telescope that has north-south and east-west lines visible therein.

If the earth's surface did not bend or deform to the weight of accumulated water after rain, the sun passing over, the changing temperature, the tides, the interference pattern would remain fixed. However, the earth is changing shape because of the effect of the various physical phenomena mentioned above. These changes are minute but none-the-less detectable in the changing pattern of fringes. The upper surface of the plate, having the north-south and east-west axes etched thereon provided a reference so that the components of tilt may be read directly and directionally and any change in the pattern corresponds to a change in tilt.

This instrument is undoubtedly one of the most sensitive indicators of the earth's changing configuration, being sensitive to approximately two-tenths of a second. Assume now that the simplified tilt meter is mounted above the aperture 149 shown in FIG. 2. The telescope 64b functions as a tiltmeter with the space 151 responding in construction and function to space 140 (FIG. 4). The fringes are removed or duplicated in the direct and reverse position by working foot screws 99b on camera 130 so that by adjustment of the camera in this way, movements of the camera are manually introduced. The tilt angles of the optical axis of the camera 130 will be equal for the direct and reverse positions (i.e. for a first levelling in one position and for a second levelling at a 180° removed position) within the accuracy of the tilt meter, namely two-tenths arc seconds for the tilt meter 132.

Camera 130 has its telescope 64b mounted above the liquid lens 98b, and all other structure in this camera is the same as camera 60, with the exception of the inclusion of one additional plano-parallel lens 150 in aperture 149 between the beam splitter prism 69b and the surface 110b of the liquid lens (water) 98b. Accordingly, numerical designation with the identifying letter is followed in FIG. 4.

The first image is taken of the star field with a level adjustment of the instrument which is observed to give a definite number of fringes in the telescope. The position of the camera is reversed and the camera re-leveled to give the same number of fringes as before. A second image of the star field is taken. By superposing these two images the zenith point may be determined at the mid-point between the two principal points on the two images.

Many modifications of this invention may be made without departing from the spirit and scope of the appended claims.

What is claimed is:

1. A zenith camera comprising a camera casing, a lens system having a positive plano-convex liquid lens with a self-levelling plane surface on top, and a negative concentric lens forming its convex surface below on a vertical axis, a photo-sensitive plate below said lenses and in alignment therewith, an auxiliary lens system mounted on said casing over said liquid lens and having a reticule and a point source of light projecting rays in alignment with said first named lens system for reflection by said self-levelling surface to indicate on said reticule the tilt of said vertical axis from the zenith.

2. In a zenith camera, the combination of a casing provided with means to photograph the zenith field and including an optical system having a plano-convex liquid lens with a self-levelling top surface over a concentric negative solid lens, a photographic plate in the focal plane of said optical system below said solid lens, a plate holder for said plate, and means separably mounting said plate holder in said casing, and an auxiliary lens system mounted on said casing over said liquid lens and having a reticule and a point source of light for projecting parallel rays axially of said optical system for reflection by the self-levelling plane surface of said liquid lens and for refocussing on said reticule to indicate the tilt of said camera from the zenith.

3. In a zenith camera of comparatively high accuracy, a casing having a liquid lens with a planar self-levelling upper surface, a concentric spherically concavo-convex glass lens supporting said liquid lens, a photographic plate in alignment with and in the focal plane of said lenses, a telescope mounted over a portion of said planar surface and closely spaced from and having a light source adapted to deliver light to said planar surface for reflection back into said telescope, a viewing eyepiece having a reticule at the upper end of said telescope for receiving said reflected light to indicate minute tilt of the camera by the appearance of interference fringes on said reticule, and means connected with said casing for levelling said casing to remove said fringes.

4. The combination of claim 3, wherein the collimating telescope has an eyepiece, the photographic plate has axes lines thereon so that the components of tilt may be read directly and any change in the pattern corresponds to a change in tilt.

5. In a zenith camera, a camera casing having a liquid lens with a self-levelling upper surface and a convex lower surface, a solid lens having a concave surface intimate with said convex liquid surface, a monochromatic light source adapted to pass light through said lenses to establish a reference, a photographic plate in alignment with said lenses and adapted to be stimulated by said source after passing through said lenses with the angularity of the light rays refracted amounts proportional to the tilt of said lenses with reference to a plane of reference, said camera casing having an opening through which rays from a star field with the last mentioned rays adapted to pass through said lenses including the planar surface of said liquid lens so that the zenith point remains unrefractively displaced when the lenses are tilted, and said zenith point exposes the photographic plate.

6. A zenith camera comprising a housing, a concentric spherical lens system therein having an image surface at the focal plane below it, a liquid lens at the top of said lens system in said housing having a self-levelling liquid surface at the level of the center of concentricity of said lens system, a point source of light in said camera, collimator means for projecting parallel rays originating at said source, along the vertical axis of said concentric spherical lens system onto said liquid surface for refraction by said liquid lens and focussing by said lens system to indicate on said image surface the displacement of said vertical axis from the true zenith, said camera having an aperture at its top over said liquid surface, said collimator means comprising a telescope extending over the central portion of said liquid lens for directing said parallel rays axially of said lens system to said surface for partial reflection back into said telescope, said point source of light being in the outer end of said telescope, and an eyepiece in said outer end having a reticule on which said reflected rays are focussed to indicate the displacement of the vertical axis of said camera from the true zenith.

7. A zenith camera as defined in claim 6, said lens system having a focal plane in the bottom of said camera, a photo-sensitive plate inserted in said bottom for receiving the image of the zenith field.

8. A zenith camera as defined in claim 6, said lens system having a focal plane in the bottom of said camera, a photo-sensitive plate inserted in said bottom for receiving the image of the zenith field, the extended end of said telescope having a flat surfaced lens closely spaced from said liquid surface, whereby the slightest tilt of the vertical axis of said camera from the true zenith will produce characteristic interference fringes on said reticule, said camera having fine levelling means for accurately aligning said vertical axis with the true zenith by adjustment to eliminate said fringes.

9. In a zenith camera, an optical system having a positive plano-concave lens of liquid with a self-levelling open surface forming its flat side and a solid concentric negative lens supporting the convex bottom of said positive lens, a photosensitive plate inserted in the focal plane of the optical system, whereby the image of the zenith position remains without refractive displacement in said focal plane in response to tilt, and an autocollimating telescope having a prism over a portion of said liquid surface in alignment with said lenses, a point light source constituting a part of said autocollimating telescope, whereby the image of the autocollimating telescope light source with reference to the image of the zenith position in the object field may be photographed on said photosensitive plate.

10. In a camera that has a casing, a liquid lens having a self-levelling planar surface on top, a solid lens having concave and convex spherical concentric surfaces respectively on the bottom of said liquid lens opposite said planar surface, said concentric surfaces being centered on a point in said planar surface, a photographic plate in alignment in the focal plane below said lenses, a collimating telescope mounted on said casing and having a point light source adapted to project its collimated rays through said planar surface to be focused on said photographic plate during exposure to indicate the axial displacement of the zenith position from the principal point in the resulting photograph.

References Cited in the file of this patent
UNITED STATES PATENTS
2,378,526    Agnew ---------------- June 19, 1945